(12) United States Patent
Chen et al.

(10) Patent No.: US 6,920,237 B2
(45) Date of Patent: Jul. 19, 2005

(54) DIGITAL IMAGE PROCESSING METHOD AND COMPUTER PROGRAM PRODUCT FOR DETECTING HUMAN IRISES IN AN IMAGE

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 603 days.

(21) Appl. No.: 09/740,422

(22) Filed: Dec. 19, 2000

(65) Prior Publication Data

US 2002/0106112 A1 Aug. 8, 2002

(51) Int. Cl.⁷ .............................................. G06K 9/00
(52) U.S. Cl. ...................... 382/117; 382/103; 382/118; 382/164; 382/165; 382/190; 382/225; 382/228
(58) Field of Search ......................... 382/103, 117–118, 382/164–165, 190, 227–228

(56) References Cited

U.S. PATENT DOCUMENTS

| | | | |
|---|---|---|---|
| 4,641,349 A | * | 2/1987 | Flom et al. ................. 382/117 |
| 5,089,976 A | | 2/1992 | Cate et al. |
| 5,128,711 A | | 7/1992 | Terashita et al. |

(Continued)

FOREIGN PATENT DOCUMENTS

| | | |
|---|---|---|
| EP | 0 635 972 A2 | 7/1994 |
| EP | 0 899 680 A2 | 3/1999 |
| JP | HEI 9 1997 216580 | 3/1996 |
| WO | WO 97/21188 | 6/1997 |
| WO | WO 99/23600 | 5/1999 |

OTHER PUBLICATIONS

Eli Saber, Xerox Corp., A. Murat Tekalp, Dept. of Engineering, Univ. of Rochester, Face Detection and Facial Feature Extraction Using Color, Shape and Symmetry–Based Cost Functions, Aug. 25, 1996, pp. 654–658, 1996 IEEE.

Jie Yang and Alex Waibel, School of Computer Science, Carnegie Mellon Univ., A Real–Time Face Tracker, May 1996, pp. 142–147, 1996 IEEE.

M.M. Chang et al., "Adaptive Bayesian Segmentation of Color Images", Journal of Electricon Imaging, vol. 3, No. 4, Oct. 1994, pp. 404–414.

*Primary Examiner*—Bhavesh M. Mehta
*Assistant Examiner*—Gregory Desire
(74) *Attorney, Agent, or Firm*—Roland R. Schindler, II (57) ABSTRACT

A digital image processing method is taught for detecting human irises in a digital image. The method comprises the steps measuring the red intensity of the pixels in the image, determining the probability that each pixel is an iris based upon the red intensity of the pixel, determining the probability that each pixel is not an iris based upon the red intensity of the pixel; and determining whether the pixel is an iris by analyzing the relationship between the probability that the pixel is an iris and the probability that the pixel is not an iris. In one embodiment of the present invention, the determination as to whether a pixel is an iris pixel is then made based upon the application of a Bayes model to the probability that the pixel is not an iris, the probability of the occurrence of an iris in the identified region and probability of the occurrence of a non-iris pixel in the identified region. In another embodiment of the present invention, the method comprises the steps of finding an oval shaped skin color region, detecting iris color pixels in the oval shaped skin color region, detecting iris color pixels in the oval shaped region using a Bayes model and locating eye positions based upon the detected iris color pixels.

A computer program product for performing these methods is also taught.

26 Claims, 8 Drawing Sheets

U.S. PATENT DOCUMENTS

| | | | |
|---|---|---|---|
| 5,130,789 A | | 7/1992 | Dobbs et al. |
| 5,432,863 A | | 7/1995 | Benati et al. |
| 5,675,376 A | * | 10/1997 | Anderson et al. ......... 348/14.16 |
| 5,905,807 A | * | 5/1999 | Kado et al. ................. 382/118 |
| 5,953,440 A | * | 9/1999 | Zhang et al. ............... 382/117 |
| 5,990,973 A | | 11/1999 | Sakamoto |
| 6,009,209 A | | 12/1999 | Acker et al. |
| 6,016,354 A | | 1/2000 | Lin et al. |
| 6,072,892 A | | 6/2000 | Kim |
| 6,095,989 A | * | 8/2000 | Hay et al. ................... 600/558 |
| 6,204,858 B1 | * | 3/2001 | Gupta ........................ 345/600 |
| 6,229,907 B1 | * | 5/2001 | Okano et al. ............... 382/117 |
| 6,292,574 B1 | | 9/2001 | Schildkraut et al. |
| 6,332,038 B1 | * | 12/2001 | Funayama et al. .......... 382/190 |
| 6,353,679 B1 | * | 3/2002 | Cham et al. ................ 382/228 |
| 6,381,345 B1 | * | 4/2002 | Swain ........................ 382/117 |
| 6,389,155 B2 | * | 5/2002 | Funayama et al. .......... 382/118 |
| 6,394,557 B2 | * | 5/2002 | Bradski ...................... 382/103 |
| 6,407,777 B1 | * | 6/2002 | DeLuca ...................... 348/576 |
| 6,546,121 B1 | * | 4/2003 | Oda ........................... 382/117 |
| 6,631,208 B1 | * | 10/2003 | Kinjo et al. ................. 382/167 |
| 6,639,998 B1 | * | 10/2003 | Lee et al. ................... 382/103 |
| 6,697,502 B2 | * | 2/2004 | Luo ........................... 382/115 |

OTHER PUBLICATIONS

T.N. Pappas, et al., "An Adaptive Clustering Algorithm for Image Segmentation", Proceedings of the International Conference on Computer Vision in Florida, Dec. 5, 1988, pp. 310–315.

* cited by examiner

Figure 8

DIGITAL IMAGE PROCESSING METHOD AND COMPUTER PROGRAM PRODUCT FOR DETECTING HUMAN IRISES IN AN IMAGE

FIELD OF THE INVENTION

The present invention relates to digital image processing methods for detecting facial features and more particularly to methods of detecting human irises in a digital image.

BACKGROUND OF THE INVENTION

In digital image processing it is often useful to detect human irises in an image. This information is used, for example, to locate other features in the image such as human eyes. This information can also be used for other purposes such as finding the orientation of a human face in the image.

Methods are known in the art for detecting human eyes. For example, U.S. Pat. No. 6,072,892 discloses the use of a thresholding method to detect the position of human eyes in a digital image. In this method, a scanning window scans across the entire image using a raster scanning method. A histogram extractor extracts intensity histograms from the window as it scans across the image. Each intensity histogram is examined by a peak detector to find three peaks in the histogram representing the skin, the white of the eye, and the black of the pupil located within the iris. A histogram having the three peaks identifies a location in an image that potentially defines an eye position. Eye position is determined from among the potential locations by calculating the area under the histogram associated with each potential location and by selecting the location associated with the histogram having the largest area.

One of the problems with this approach is that the entire image must be scanned on a pixel-by-pixel basis. Thus, a search window must be positioned at each pixel and a histogram must be assembled at each pixel location. Further, the area under each histogram must be calculated and stored. It will be appreciated that this method consumes enormous amounts of computing power and reduces the rate at which images can be processed. This method can also produce a high rate of false positives.

Methods are also known to detect eyes that have abnormally high red content. Such abnormal red content is commonly associated with a photographic phenomenon known as red eye. Red eye is typically caused by a flash of light that is reflected by a pupil. As is described in commonly assigned and co-pending U.S. patent application Ser. No. 08/919,560, it is known to search for images for pixels having the high red content that is indicative of red eye. Similarly, commonly assigned U.S. Pat. No. 5,432,863 describes a user interactive method for detecting pixels in an image that have color characteristic of red eye. It will be recognized that these methods detect eyes only where red eye is present.

Thus, there is a need for a method of locating human irises in a digital image that is accurate and efficient.

SUMMARY OF THE INVENTION

The need is met according to the present invention by a digital image processing method for detecting human irises in a digital image. This method comprises the steps of: measuring the red intensity of the pixels in the image, determining the probability that each pixel is an iris based upon the red intensity of the pixel, determining the probability that each pixel is not an iris based upon the red intensity of the pixel; and determining whether the pixel is an iris by analyzing the relationship between the probability that the pixel is an iris and the probability that the pixel is not an iris. In one embodiment of the present invention, the determination as to whether a pixel is an iris pixel is made based upon the application of a Bayes model to the probability that the pixel is an iris, to the probability that the pixel is not an iris, the probability of the occurrence of an iris in the image and probability of the occurrence of a non-iris pixel in the image.

In another embodiment of the present invention, skin color regions are detected in the image and only the pixels within the skin color regions are measured for red intensity. The determination as to whether a pixel is an iris pixel is made based upon the application of a Bayes model to the probability that the pixel is an iris, the probability that the pixel is not an iris, the probability of the occurrence of an iris in the skin color region and the probability of a non-iris in the skin color region.

The need is also met according to the present invention by a method for detecting irises in a digital image comprising the steps of finding an oval shaped skin color region, detecting iris color pixels in the oval shaped region using a Bayes iris model and locating eye positions based upon the detected iris color pixels.

The need is also met according to the present invention by a computer program product for detecting irises in a digital image comprising: a computer readable storage medium having a computer program stored thereon for performing the method of the present invention.

The present invention is effective to obtain iris positions in a frontal face image and has the advantage of reducing the region of the image that must be searched, thereby greatly reducing the computation required to locate an eye, and reducing the incidence of eye detection false positives.

DETAILED DESCRIPTION OF THE INVENTION

Figure 1:
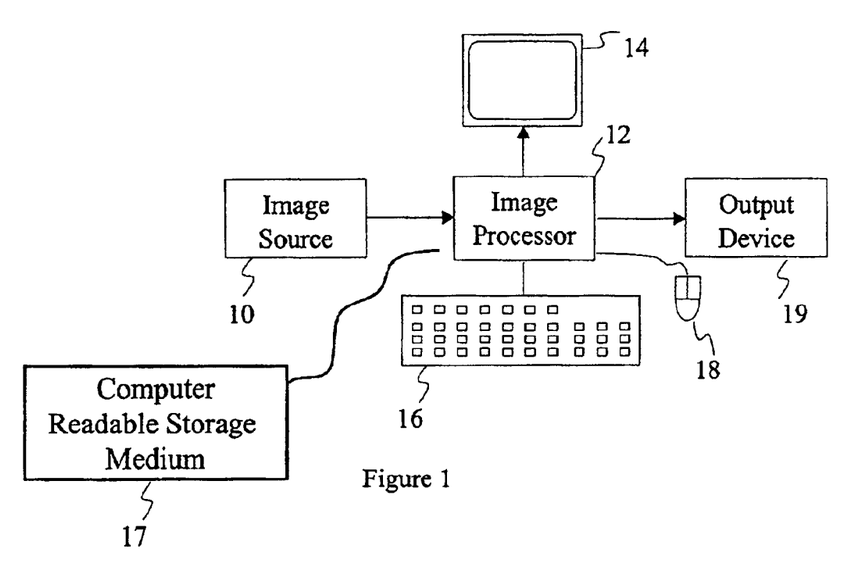
FIG. 1 is a schematic diagram of an image processing system useful in practicing the present invention.

FIG. 1, shows an image processing system useful in practicing the present invention including a color digital image source 10, such as a film scanner, digital camera, or digital image storage device such as a compact disk drive with a Picture CD. The digital image from the digital image source 10 is provided to an image processor 12, such as a programmable personal computer, or digital image processing work station such as a Sun Sparc workstation. The image processor 12 may be connected to a CRT display 14, an operator interface such as a keyboard 16 and a mouse 18. Image processor 12 is also connected to computer readable storage medium 17. The image processor 12 transmits processed digital images to an output device 19. Output device 19 can comprise a hard copy printer, a long-term image storage device, a connection to another processor, or an image telecommunication device connected for example to the internet.

In the following description, a preferred embodiment of the present invention will be described as a method. However, in another preferred embodiment, the present invention comprises a computer program product for detecting human eyes and irises in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

Figure 2:
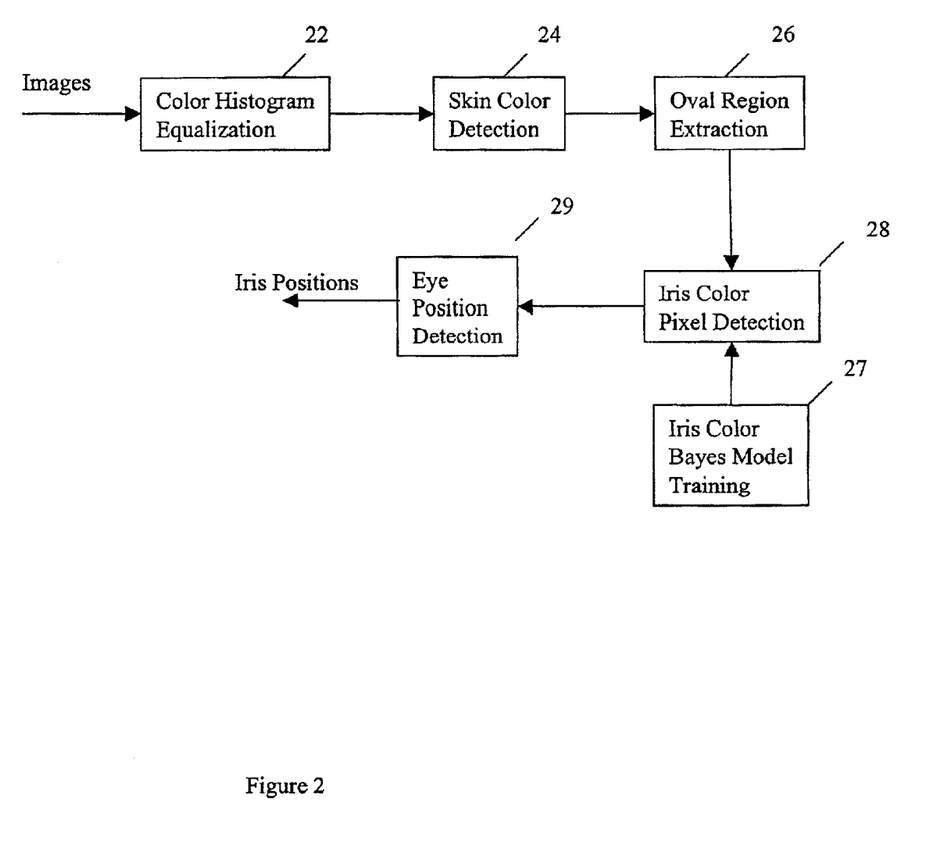
FIG. 2 is a flowchart illustrating the eye detection method of the present invention.

Turning now to FIG. 2, the method of the present invention will be described in greater detail. FIG. 2 is a flow chart illustrating one embodiment of the iris detection method of the present invention. In the embodiment shown in FIG. 2, iris detection is accomplished by first detecting skin colored regions in the image and then identifying iris pixels from the skin colored regions.

The first step in skin color detection is color histogram equalization shown in FIG. 2 as step 22. Color Histogram Equalization step 22 receives images to be processed and ensures that the images are in a form that will permit skin color detection. This step is made necessary because human skin may take on any number of colors in an image because of lighting conditions, flash settings or other circumstances. This makes it difficult to automatically detect skin in such images. In Color Histogram Equalization step 22, a statistical analysis of each image is performed. If the statistical analysis suggests that the image may contain regions of skin that have had their appearance modified by lighting conditions, flash settings or other circumstances then such images are modified so that skin colored regions can be detected.

After the Color Histogram Equalization step 22, the image is searched for skin color regions in Skin Color Detection step 24. While it is possible to detect skin in a digital image in a number of ways, a preferred method for detecting skin in a digital image is to separated skin color pixels from other pixels in an image by defining a working color space that contains a range of possible skin colors collected from a large population of images. A pixel is then identified as skin color pixel if the pixel has a color that is within the working color space.

Skin Color Detection step 24 identifies a region of skin color pixels in the image. This region can be defined in any number of ways. In one embodiment, the skin color region is defined by generating a set of pixel locations identifying the pixels in the image having skin colors. In another embodiment, a modified image is generated that contains only skin color pixels. In yet another embodiment, Skin Color Detection step 24 defines boundaries that confine the skin color region in the image. It will be recognized that more than one skin color region can be identified in the image.

Oval Region Extraction step 26 examines the skin color regions detected by the Skin Color Detection step 24 to locate skin color regions that may be indicative of a face. Because the human face has a roughly oval shape, the skin color regions are examined to locate an oval shaped skin color region. When an oval shaped skin color region is found, the Oval Region Extraction step 26 measures the geometric properties of the oval shaped skin color region. The Oval Region Extraction step 26 uses these measurements to define parameters that describe the size of the face and the location of the face within the image.

Figure 3:
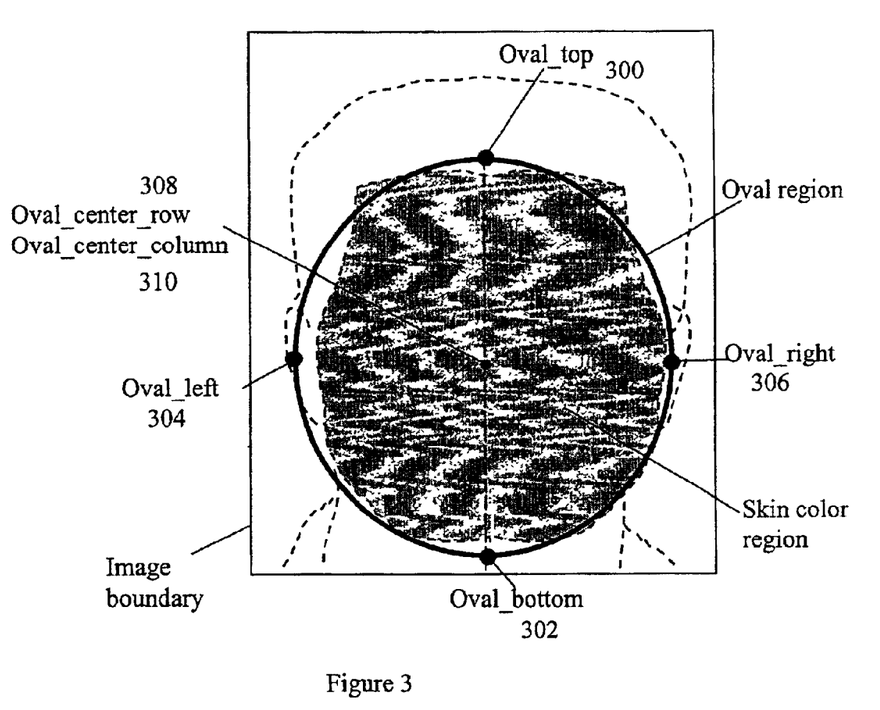
FIG. 3 is an illustration showing the relationship between certain geometric parameters and an oval shaped skin colored region in an image.

FIG. 3 is an illustration of the relationship between the geometric parameters used to define an oval shaped skin color region in the image. As is shown in FIG. 3, these parameters include Oval_top 300, Oval_bottom 302, Oval_left 304, Oval_right 306, Oval_center_row 308, and Oval_center_column 310. These parameters are can be used in subsequent processing of the image. It will be recognized that the method of the present invention can be practiced using skin color detection regions that have shapes that are other than oval and that other geometric parameters can be defined in association with such shapes. It will also be recognized that it is not necessary to detect an oval or other shaped area in the image. In such case, the skin color region is examined to detect iris color pixels. Further, in such a case, still other parameters describing the skin color region are defined for use in the eye detection process.

After the oval region extraction has been performed, Iris Color Pixel Detection step 28 examines the pixels in the oval shaped skin color region to detect iris color pixels. In the method of the present invention, Iris Color Pixel Detection step 28 determines whether a pixel is an iris by measuring the red intensity of the pixel. Red intensity levels are measured because it has been observed that that a human iris has a low red intensity level as compared to human skin which has a relatively high red intensity level. However, the method of the present invention does not use a red level thresholding method to determine whether a pixel is to be classified as an iris or as a non-iris.

Figure 4A:
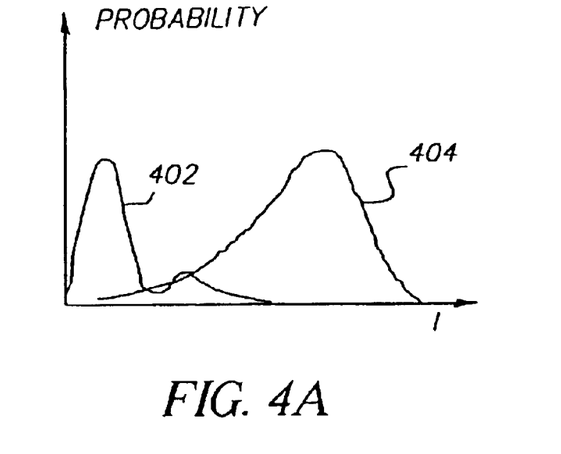
FIG. 4A is an illustration showing, the conditional probability that a given pixel is an iris pixel stated as a function of a specific red intensity and the conditional probability that a given pixel is a non-iris pixel as a function of a specific red intensity I.

Instead, the present invention classifies a pixel as an iris or a non-iris pixel on the basis of a probability analysis. This probability analysis applies an iris statistical model and a non-iris statistical model. The iris statistical model defines the probability that a given pixel is an iris pixel based upon the red intensity level of the pixel. Similarly, the non-iris statistical model defines the probability that a given pixel is not an iris pixel based upon the red intensity level of the pixel. The relationship between these models is non-linear as is shown by way of example in FIG. 4A which is an illustration of the conditional probability 402 that a given pixel is an iris pixel stated as a function of a specific red intensity and the conditional probability 404 that a given pixel is a non-iris pixel as a function of a specific red intensity I.

The probability analysis can take many forms. For example, the probabilities can be combined in various ways with a pixel being classified as an iris or not on the basis of the relationship between these probabilities. However, in a preferred embodiment, a mathematical construct known as a Bayes model is used to combine the probabilities to produce the conditional probability that a pixel having a given red intensity belongs to an iris.

In this embodiment, the Bayes model is applied as follows:

$$P(\text{iris} \mid I) = \frac{P(I \mid \text{iris})P(\text{iris})}{P(I \mid \text{iris})P(\text{iris}) + P(I \mid \text{noniris})P(\text{noniris})},$$

where P(iris|I) is the conditional probability that a given pixel intensity belongs to an iris; P(I|iris) is the conditional probability that a given iris pixel has a specific intensity I; P(iris) is the probability of the occurrence of an iris in the face oval region; P(I|noniris) is the conditional probability that a given non-iris pixel has a specific intensity I; and P(noniris) is the probability of the occurrence of a non-iris pixel in the face oval region. The Bayes model further applies the probability of the occurrence of an iris in a face oval region and the probability of the occurrence of a non-iris pixel in the face oval region. Using a probability analysis based on the Bayes model, a pixel is classified as an iris if the conditional probability that a pixel having a given red intensity belongs to an iris is greater than, for example, 0.05.

In the embodiment described above, only those pixels in the oval shaped skin color region defined by Oval_top 300, Oval_bottom 302, Oval_left 304, and Oval_right 306 are examined. Confining the pixels to be examined to those in the oval shaped skin color region reduces number of pixels to be examined and decreases the likelihood that pixels that are not irises will be classified as such. It will be understood that confining the pixels to be examined to those in the skin color region, as is described in other embodiments of the present invention, conveys similar advantages. It will also be understood that it is not necessary to detect skin color regions and that the present invention can be practiced by measuring the red intensity of each pixel in the image and determining whether a pixel is an iris based upon the probability analysis described above.

Figure 4B:
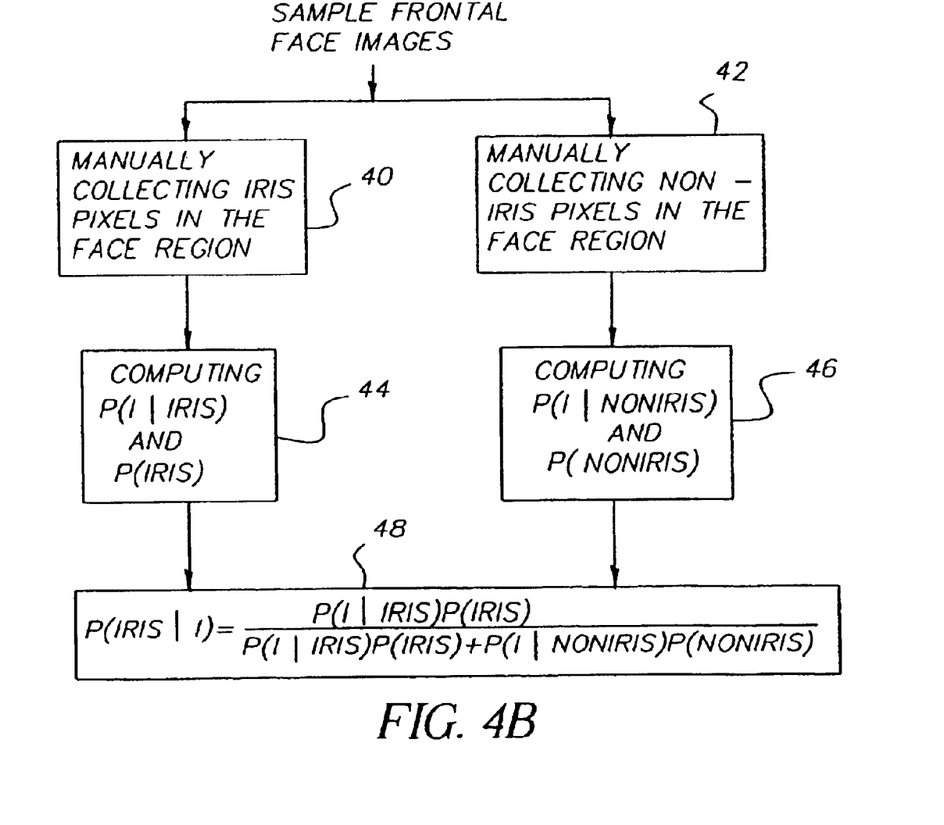
FIG. 4B is a flowchart presenting the process of developing a statistical model representing the conditional probability that a given pixel is an iris pixel as a function of a specific red intensity level and the a statistical model representing the conditional probability that a given pixel is an iris pixel as a function of a specific red intensity level.

FIG. 4B shows a flow chart illustrating the processes used in the Iris Color/Bayes Model Training step 27 of FIG. 2 for developing the statistical models used to classify the pixels. This step will be performed before the method for detecting irises is used to detect iris pixels. As is shown, a large sample of frontal face images are collected and examined. All iris pixels and non-iris pixels in the face region of each image are then manually identified 40, 42. Next, the conditional probability that a given iris pixel has a specific red intensity I, P(I|iris) is computed and the probability of the occurrence of an iris in the face oval region, P(iris) 44 is computed; then the conditional probability that a given noniris pixel has a specific red intensity I, P(I|noniris) is computed and finally the probability of the occurrence of a non-iris pixel in the face oval region, P(noniris) 46 is computed. The computed statistical models of iris and non-iris are used in the Bayes formula to produce the conditional probability that a given pixel intensity belongs to an iris, P(iris|I) 48. In application, the Bayes model can be used to generate a look-up table to be used in Iris Color Pixel Detection step 28.

The Iris Color Pixel Detection step 28 identifies the location of the iris color pixels in the image. In some cases, it will be desirable to ensure that the iris color pixels that are detected are associated with an eye. This is done by performing the step of eye detection. Eye Position Detection step 27 is used to estimate the eye positions. It will be appreciated that there are many ways to determine whether an iris pixel is associated with an eye in the image. In one preferred embodiment of the present invention, the iris color pixel locations are used to facilitate the process of determining whether an iris pixel is associated with an eye in the image.

Figure 5:
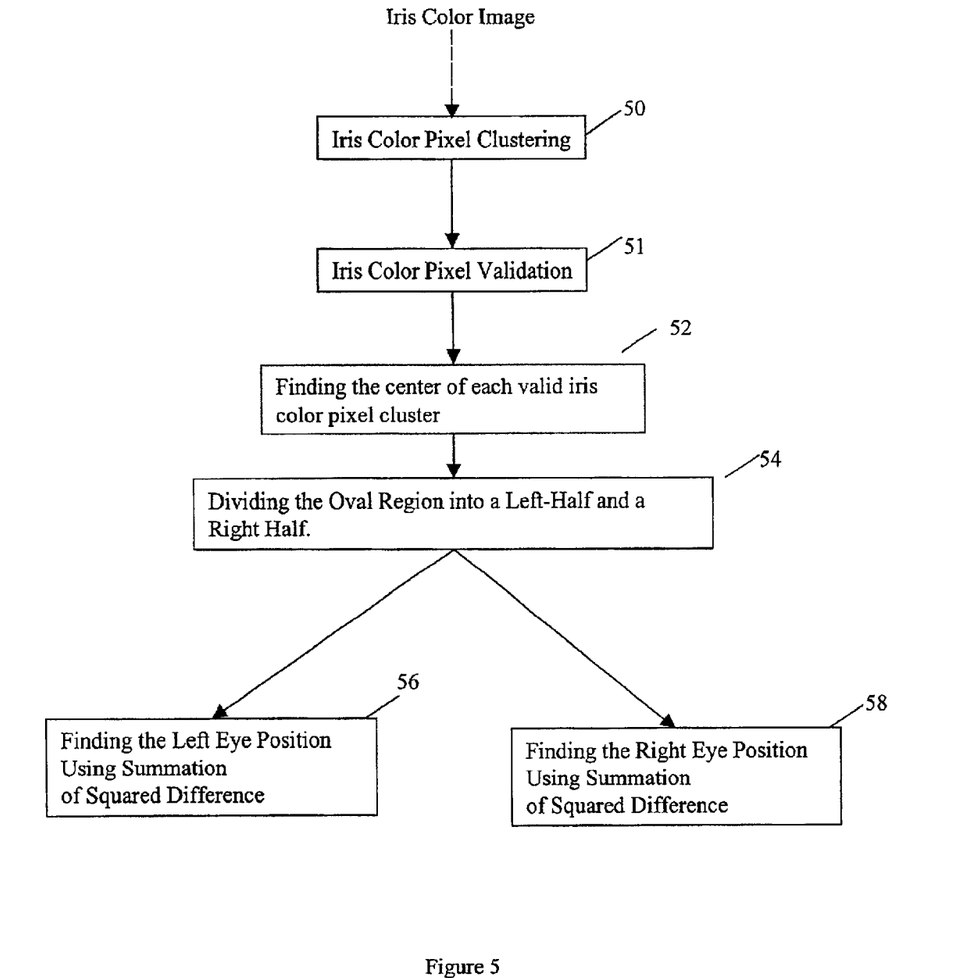
FIG. 5 is a flowchart illustrating the process of eye position detection after detecting the iris color pixel clusters.

FIG. 5 shows a flow chart illustrating the process of eye position detection using the iris color pixels. As is shown in FIG. 5, the eye position detection process starts with an Iris Pixel Clustering step 50. If iris color pixels are detected, then the iris pixels must be assigned to a cluster. A cluster is a non-empty set of iris color pixels with the property that any pixel within the cluster is also within a predefined distance to another pixel in the cluster. One example of a predefined distance is one thirtieth of the digital image height. The Iris Pixel Clustering step 50 of FIG. 5 groups iris color pixels into clusters based upon this definition of a cluster. However, it will be understood that pixels may be clustered on the basis of other criteria.

Under certain circumstances, a cluster of pixels may not be valid. Accordingly, the optional step of validating the clusters is shown in FIG. 5 as Cluster Validation step 51. A cluster may be invalid because, if it contains too many iris color pixels or because the geometric relationship of the pixels in the cluster suggests that the cluster is not indicative of an iris. For example, if the ratio is greater than two, then this cluster is invalid. Invalid iris pixel clusters are removed from further consideration by the method of the present invention. Accordingly, in the portions of the description that follow, valid iris pixel clusters will be referred to simply as iris pixel clusters.

After the clustering operation, a center for each of the clusters is calculated in Cluster Centering step 52. The center of a cluster is determined as the center of mass of the cluster. The center position of the clusters is calculated with respect to the origin of the image coordinate system. The origin of the image coordinate system for a digital image is defined is at the upper left corner of the image boundary.

Figure 6:
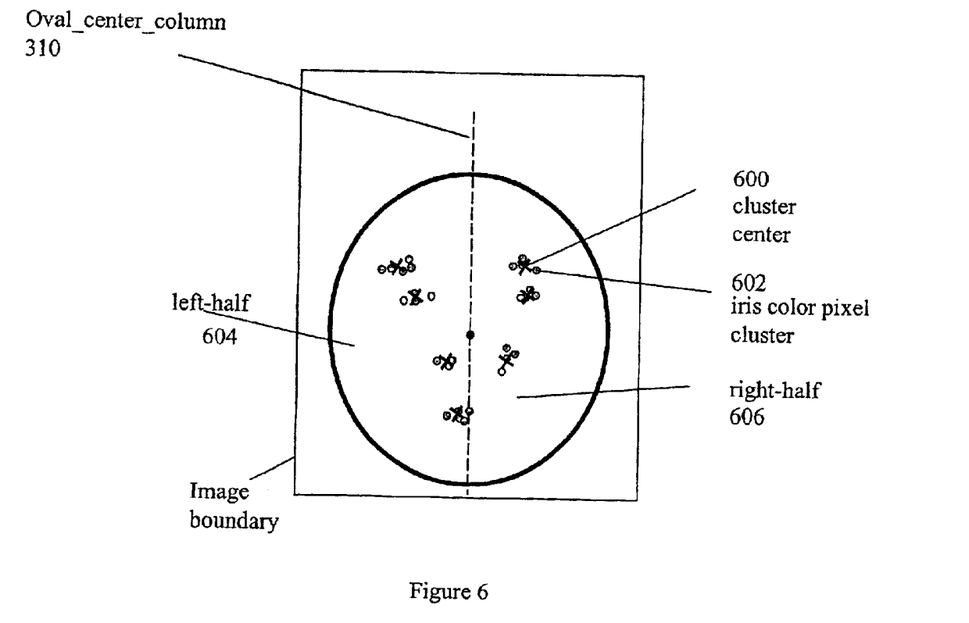
FIG. 6 is an illustration showing the iris color pixel clusters.

Oval division step 54 uses the Oval_center_column 310 parameter to separate the oval shaped skin color region into a left-half region and a right-half region. As is shown in FIG. 6 iris pixel clusters 602 and the center positions 600 of the iris pixel clusters 602 are positioned in either the left-half or right-half regions 604 and 606 separated by the Oval_Center_Column 310.

To locate eyes in the image using the iris pixel clusters, a left-eye position search 56 is conducted in the left-half region using a method known as the Summation of the Squared Difference. A right-eye position search 58 is also conducted in the right-half region based on the same Summation of the Squared Difference method. In general, the summation of the squared difference method involves calculating the summation of the squared difference of the intensity values of the corresponding pixels in an eye template and a patch of the image that has the same size as the template. In this method, each pixel in the patch of pixels has a corresponding pixel in the template. The difference between the intensity level of each of the corresponding pixels is calculated. Each difference is then squared. The sum of each of the squared differences for each of the pixels in the set is then calculated. This summation of the squared differences provides a relative measure of the degree of correspondence between each of the pixel sets measured and the template. The eye template itself is generated by averaging a large number of sample eye images.

As applied in the present invention, summation of the squared difference values are calculated for each pixel in each window in each half-region. These values are compared and the pixel having the lowest relative summation of the squared difference value is identified as an eye location for the half-region. This process is performed separately on the clusters of the left and the right-half regions of the image in the manner described below.

It will be noted that while the present invention has been described as using the summation of the squared difference method to identify the best relative match between the average eye template and each of the pixels, other methods to determine the degree of relative correspondence can be used. In particular, the mean-squared error method can be used in place of the summation of the squared difference method.

Figure 7:
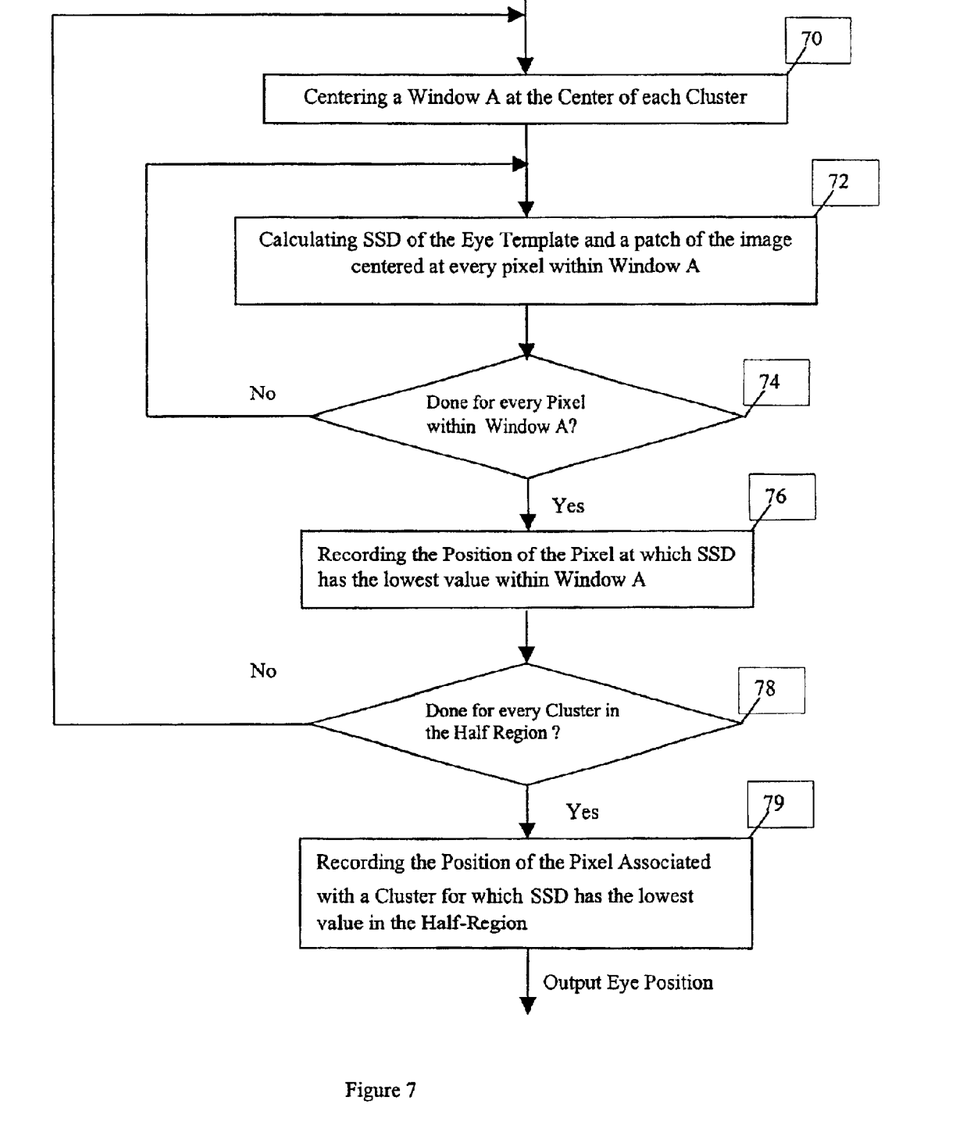
FIG. 7 is a flowchart illustrating the details of the process of applying the method of summation of squared difference to eye position detection.
Figure 8:
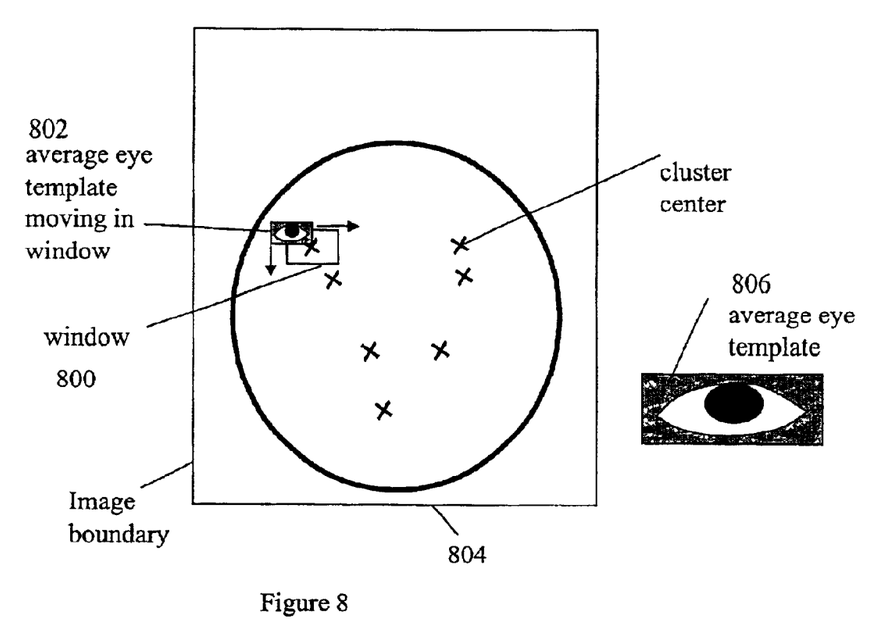
FIG. 8 shows an eye template and a search window centered at the center of a cluster.

Referring to FIGS. 7 and 8, the eye position search process 56 or 58 is started with centering 70 a window 800 at the center of each cluster 802 in a respective half-region. The operation of calculating the summation of the squared differences 72 is then performed, separately, using a patch of pixels centered on each of the pixels in each of windows 74. The position of the pixel having the lowest summation of squared difference value in each window 800 is recorded 76. When this process has been completed for every cluster center 802 in a half region 78, the position of the pixel having the lowest summation of squared difference value is recorded 79. This position is the eye position for the half-region.

It will be appreciated that the summation of the squared difference method of steps 56 and 58 of FIG. 5, can also be performed without the use of oval region extraction. In such an embodiment, the skin colored region can be divided into a left-half region and a right-half region. Iris pixel clusters can then be divided into left-half region and right-half region clusters. The summation of the squared difference method can then be applied.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

In this manner, the present invention provides an efficient method for detecting normally appearing human irises in a digital image.

The invention has been described in detail with particular reference to certain preferred embodiments thereof, but it will be understood that variations and modifications can be effected within the spirit and scope of the invention.

PARTS LIST

10 digital image source
12 image processor
14 display
16 keyboard
17 computer readable storage medium
18 mouse
19 output device
22 color histogram equalization step
24 skin detection step
26 oval region extraction step
27 iris color Bayes model training step
28 iris color pixel detection step
29 eye position detection step
40 iris pixels
42 non-iris pixels
44 computing step
46 computing step
48 computing step
50 iris pixel clustering step
51 cluster validation step
52 cluster centering step
54 oval division step
56 left eye position search
58 right eye position search
70 window centering
72 summation of squared difference calculation
74 checking step
76 position recording step
78 checking step
79 position recording step
300 Oval_top
302 Oval_bottom
304 Oval_left
306 Oval_right
308 Oval_center_row
310 Oval_center_column
402 probability curve
404 probability curve
600 cluster center
602 iris color pixel
604 left half region
606 right half region
800 a window
802 average eye template moving in window
804 an image
806 average eye template

What is claimed is:

1. A digital image processing method for detecting human irises in a digital image, comprising the steps of:

measuring the red intensity of the pixels in the image;

determining the probability that each pixel is an iris based upon the red intensity of the pixel;

determining the probability that each pixel is not an iris based upon the red intensity of the pixel; and determining whether each pixel is an iris by analyzing the relationship between the probability that the pixel is an iris and probability that the pixel is not an iris.

2. The method of claim 1, wherein the step of determining whether each pixel is an iris is based upon the application of a Bayes model to the probability that the pixel is an iris, the probability that a pixel is not an iris, the probability of the occurrence of a non-iris pixel in the image and the probability of the occurrence of a non-iris pixel in the image.

3. The method of claim 1, further comprising the step of detecting skin color regions in the image and wherein the step of measuring the red intensity comprises measuring the red intensity of only the pixels in the skin color region.

4. The method of claim 3, further comprising the step of performing color equalization on the image prior to the step of detecting skin color regions in the image.

5. The method of claim 4, wherein the step of determining whether each pixel is an iris is based upon the application of a Bayes model to the probability that the pixel is an iris, the probability that the pixel is not an iris, the probability of the occurrence of an iris in a skin color region, and the probability of the occurrence of a non-iris pixel in a skin color region.

6. The method of claim 4, further comprising the step of finding oval shaped skin colored regions in the image and wherein the step of measuring the red intensity of the pixels in the skin color region comprises measuring only those pixel within an oval shaped skin color region.

7. The method of claim 6, wherein the step of determining whether each pixel is an iris is based upon the application of a Bayes model to the probability that the pixel is an iris, the probability that the pixel is not an iris, the probability of the occurrence of an iris in a skin color region, and the probability of the occurrence of a non-iris pixel in a skin color region.

8. The method of claim 1, further comprising the step of finding oval shaped skin colored regions in the image and wherein the step of measuring the red intensity of the pixels in the image comprises measuring only those pixels within an oval shaped skin colored region.

9. The method of claim 8, wherein the step of determining whether each pixel is an iris is based upon the application of a Bayes model to the probability that the pixel is an iris, the probability that the pixel is not an iris, the probability of the occurrence of an iris in a skin color region, and the probability of the occurrence of a non-iris pixel in a skin color region.

10. A method for detecting human irises and eyes in a digital image comprising the steps of:
finding a skin color region;
detecting iris color pixels in the skin colored region using a Bayes model; and
locating eve positions based upon the detected iris color pixels,
wherein the step of locating eye positions based upon the detected iris color pixels comprises the steps of:
clustering iris color pixels;
finding the center of each cluster;
dividing the skin colored region into a left-half and a right-half;
locating the most likely left eye position in the left-half region using the summation of squared difference method; and
locating the most likely right eye position in the right-half region using the summation of squared difference method.

11. The method of claim 10, wherein the step of locating the most likely left eye position using the summation of squared difference method comprises the steps of:
defining a window of pixels surrounding the center of each of the clusters in the image;
dividing the iris pixel clusters into left-half pixel clusters and right-half pixel clusters; and
locating the most likely left eye position based on the summation of squared difference between an average eye and patch of the image centered at each of the pixels in each of the windows surrounding a left-half iris pixel cluster.

12. The method of claim 10, wherein the step of locating the most likely right eye position using the summation of squared difference method comprises the steps of:
defining a window of pixels surrounding the center of each of the clusters in the image;
dividing the iris, pixel clusters into left-half iris pixel clusters and right-half pixel clusters; and
locating the most likely right eye position based on the summation of squared difference between an average eye and patches of the image centered at each of the pixels in each of the windows surrounding a right-half iris pixel cluster.

13. A method for detecting human irises and eyes in a digital image comprising the steps of:
finding a skin color region;
detecting iris color pixels in the skin colored region using a Bayes model; and
locating eye positions based upon the detected iris color pixels;
wherein the step of detecting iris color pixels using a Bayes model comprises measuring the red intensity of the pixels in the skin color region;
determining the probability that each pixel is an iris based upon the red intensity of the pixel;
determining the probability that each pixel is not an iris based upon the red intensity of the pixel; and
applying a Bayes model to the probability that the pixel is an iris, the probability that the pixel is not an iris, the probability of the occurrence of an iris in the skin colored region and probability of the occurrence of a non-iris pixel in the skin colored region.

14. A computer program product for detecting human irises in a digital image, the computer program product comprising a computer readable storage medium having a computer program stored thereon for performing the steps of:
measuring the red intensity of the pixels in the image;
determining the probability that each pixel is an iris based upon the red intensity of the pixel;
determining the probability that each pixel is not an iris based upon the red intensity of the pixel; and
determining whether each pixel is an iris by analyzing the relationship between the probability that the pixel is an iris and probability that the pixel is not an iris.

15. The computer program product of claim 14, wherein the step of determining whether each pixel is an iris is based upon the application of a Bayes model to the probability that the pixel is not an iris, the probability of the occurrence of an iris in the image, and the probability of the occurrence of a non-iris pixel in the image.

16. The computer program product of claim 14, further comprising the step of detecting skin color regions in the image and wherein the step of measuring the red intensity comprises measuring the red intensity of only the pixels in the skin color region.

17. The computer program product of claim 14, further comprising the step of performing color histogram equalization on the image prior to performing the step of detecting skin color regions in the image.

18. The computer program product of claim 17, wherein said computer program product performs the step of determining whether the pixel is an iris is based upon the application of a Bayes model to the probability that the pixel is an iris, the probability that the pixel is not an iris, the probability of the occurrence of an iris in the skin color region and probability of the occurrence of a non-iris pixel in the skin color region.

19. The computer program product of claim 17, further comprising the step of finding oval shaped skin colored regions in the image and wherein the step of measuring the red intensity of the pixels in the image comprises measuring only those pixels within an oval shaped skin colored region.

20. The computer program product of claim 19, wherein the step of determining whether the pixel is an iris is based upon the application of a Bayes model to the probability that the pixel is an iris, the probability that the pixel is not an iris, the probability of the occurrence of an iris in a skin color region, and the probability of the occurrence of a non-iris pixel in a skin colored region.

21. The computer program product of claim 14, further comprising the step of finding oval shaped skin colored regions in the image and wherein the step of measuring the red intensity of the pixels in the image comprises measuring only those pixels within an oval shaped skin colored region.

22. The computer program product of claim 21, wherein said computer program product performs the step of determining whether the pixel is an iris is based upon the application of a Bayes model to the probability that the pixel is an iris, the probability that the pixel is not an iris, the probability of the occurrence of an iris in the skin color region and probability of the occurrence of a non-iris pixel in the skin color region.

23. A computer program product for detecting human irises and eyes in a digital image, the computer program product comprising a computer readable storage medium having a computer program stored thereon for performing the steps of:

finding a skin colored region;

detecting iris color pixels in the skin colored region using a Bayes model; and locating eye positions based upon the detected iris color pixels;

wherein the step of locating eye positions based upon the detected iris color pixels comprises the steps of:

clustering iris color pixels;

finding the center of each cluster;

dividing the skin colored region into a left-half and a right-half;

locating the most likely left eye position in the left-half region using the summation of squared difference method; and locating the most likely right eye position in the right-half region using the summation of squared difference method.

24. The computer program product of claim 23, wherein the step of locating the most likely left eye position is performed using the summation of squared difference method comprises the steps of:

defining a window of pixels surrounding the center of each of the clusters in the image;

dividing the iris pixel clusters into left-half iris pixel clusters and right-half pixel clusters; and locating the most likely left eye position based on the summation of squared difference between an average eye and patch of the image centered at each of the pixels in each of the windows surrounding a left-half iris pixel cluster.

25. The computer program product of claim 24, wherein the step of locating the most likely right eye position is performed using the summation of squared difference method comprises the steps of:

defining a window of pixels surrounding the center of each of the iris pixel clusters in the image;

dividing the iris pixel clusters into left-half iris pixel clusters and right-half pixel clusters; and locating the most likely right eye position based on the summation of squared difference between an average eye and patches of the image centered at each of the pixels in each of the windows surrounding a right-half iris pixel cluster.

26. The computer program product of claim 23 wherein the step of detecting iris color pixels using a Bayes model comprises measuring the red intensity of the pixels in the skin color region;

determining the probability that each pixel is an iris based upon the red intensity of the pixel;

determining the probability that each pixel is not an iris based upon the red intensity of the pixel; and applying the Bayes model to the probability that the pixel is an iris, the probability that the pixel is not an iris, the probability of the occurrence of an iris in the skin colored region and probability of the occurrence of a non-iris pixel in the skin colored region.

* * * * *

UNITED STATES PATENT AND TRADEMARK OFFICE
CERTIFICATE OF CORRECTION

PATENT NO. : 6,920,237 B2
DATED : July 19, 2005
INVENTOR(S) : Shoupu Chen et al.

It is certified that error appears in the above-identified patent and that said Letters Patent is hereby corrected as shown below:

Column 9,
Line 8, replace "a non-iris" with -- an iris --.

Signed and Sealed this

Eighth Day of November, 2005

JON W. DUDAS
*Director of the United States Patent and Trademark Office*